(No Model.) 2 Sheets—Sheet 1.
H. RIMMER.
PROCESS OF PURIFYING FERRIC CARBIDE.
No. 399,082. Patented Mar. 5, 1889.
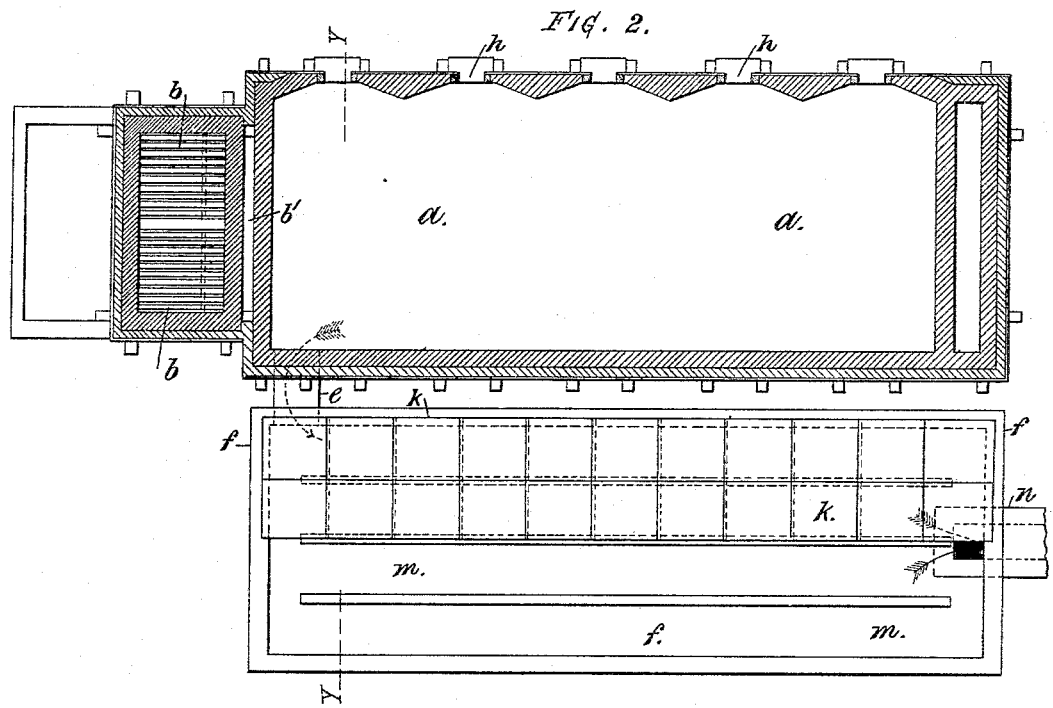
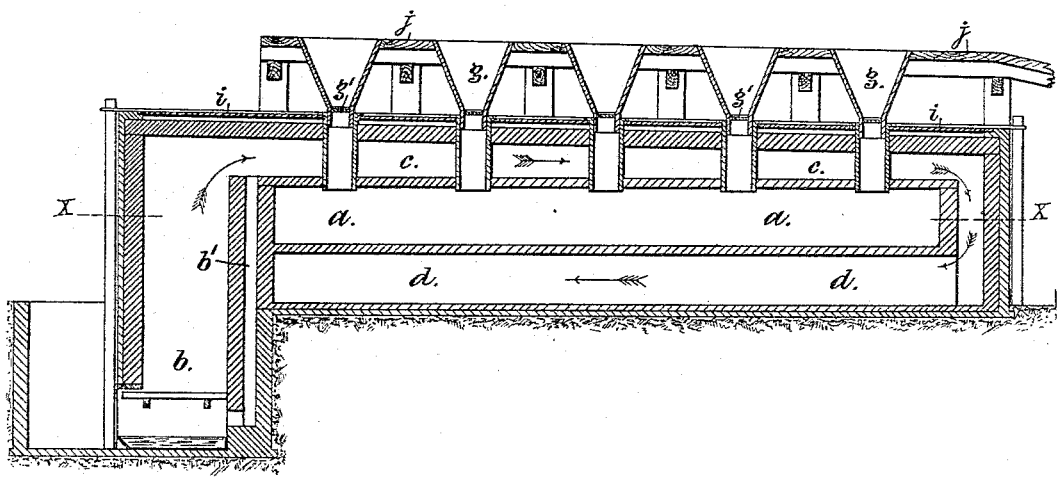
Witnesses.
J. A. Rutherford
Robert Emmett
Inventor.
Harold Rimmer
By James L. Norris
Atty.

(No Model.) 2 Sheets—Sheet 2.
H. RIMMER.
PROCESS OF PURIFYING FERRIC CARBIDE.
No. 399,082. Patented Mar. 5, 1889.
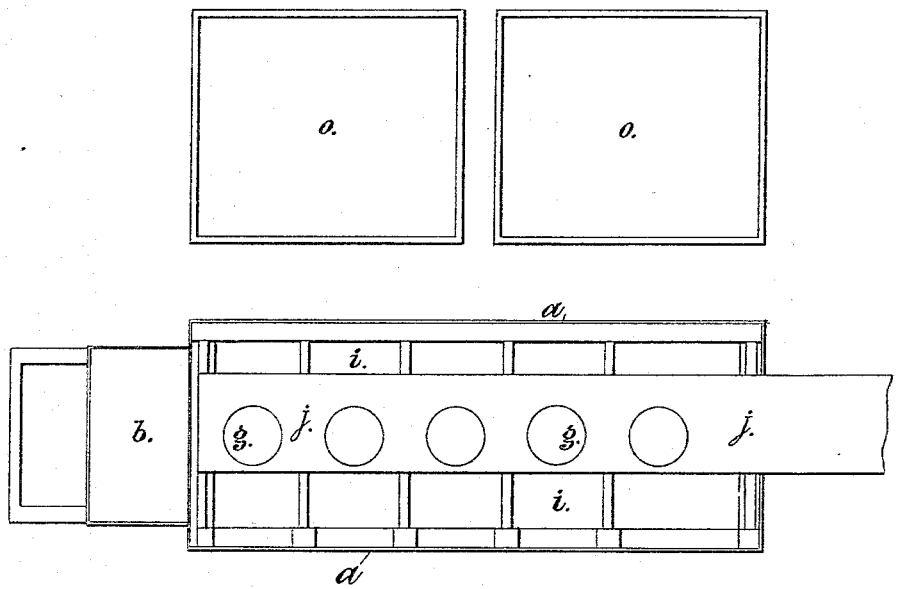
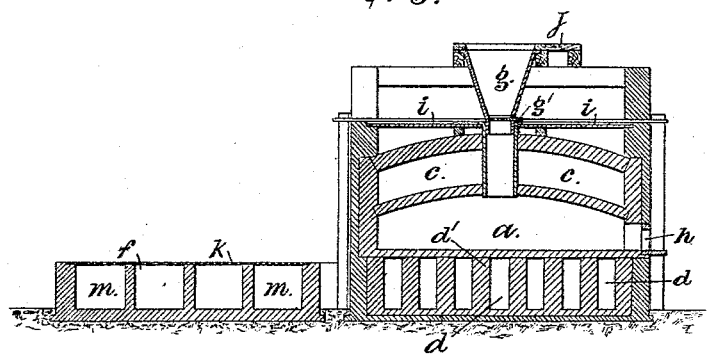
Witnesses.
J. A. Rutherford
Robert Everitt
Inventor.
Harold Rimmer
By James L. Norris.
Atty.

UNITED STATES PATENT OFFICE.

HAROLD RIMMER, OF SANSIDE, ULVERSTON, COUNTY OF LANCASTER, ENGLAND.

PROCESS OF PURIFYING FERRIC CARBIDE.

SPECIFICATION forming part of Letters Patent No. 399,082, dated March 5, 1889.

Application filed November 1, 1888. Serial No. 289,751. (No model.) Patented in England June 10, 1887, No. 8,357.

*To all whom it may concern:*

Be it known that I, HAROLD RIMMER, a subject of the Queen of Great Britain and Ireland, residing at Sanside, Ulverston, in the county of Lancaster, England, have invented new and useful Improvements in the Manufacture of Material for Purifying and Filtering Water, Saccharine and Alcoholic and other Fluids, (for which I have obtained patent in Great Britain, No. 8,357, dated June 10, 1887,) of which the following is a specification.

This invention relates to the production of a filtering and purifying material known as "magnetic carbide of iron" from iron ores, which are composed chiefly of iron and oxygen—namely, those known as "hematite" ores and equivalent ores, including "magnetic," "specular," and "spathic" ores. Hitherto it has been proposed to make the purifying and filtering material termed "magnetic carbide of iron" from iron ores, but more particularly from hematite ores, specular iron ore, "chalybite," and "spathose" ores. It has, however, been found in practice that only a particular kind or kinds of such ores are applicable for the manufacture of the "magnetic carbide" for purifying water or saccharine and alcoholic liquors. These kinds consist, substantially, of pure oxide of iron—such as that known as "kidney ore" of the hematite class. This particular kind of pure ore exists in very small and irregularly-deposited quantities, and consequently through the difficulties in the way of obtaining the special kinds—namely, the pure ores—the quantity of purifying material available is proportionately small. I have found that the cause which renders the ordinary hematite (such as red hematite) and equivalent ores unapplicable for use or treatment in the heretofore-known processes for making magnetic carbide applicable for purifying water, saccharine and alcoholic liquors is the presence in them of certain impurities, that these impurities are chiefly lime, magnesia, phosphorus, and sulphur, and that they are not removed by the treatment according to the said known processes.

Now this invention consists in the manufacture or production from iron ores—such as the ordinary hematite and equivalent ores containing the said impurities or any of them—of the magnetic carbide of iron, as hereinafter set forth.

According to this invention I first treat such ores substantially as heretofore, and afterward remove or render negative the impurities that are inimical to purification of water by treating the magnetic carbide with an acid purifying process.

Generally stated, the whole process is as follows: The ore, being ground or broken into small pieces, the largest of which will pass a quarter-inch sieve, and mixed with granulated carbon—such as coke—is heated in a closed receptacle or chamber, such as a muffle. The temperature of the muffle must be such as will effect the required union of the carbon with the oxide of iron, but not great enough to reduce the ore to the metallic state. During the time the mixture is subjected to this treatment it is preferably stirred or raked about by suitable implements for the purpose of making the treatment of the whole mass of the material equal and to facilitate and make the process more rapid. To expel the air or to neutralize the deterrent action of the air present in the muffle or chamber, I may inject steam into the muffle, and so force out most of the air; or the same object may be obtained by adding to the mixture of ore and carbon (coke) a little wood or sawdust. The ore is first reduced to a lower oxide. The carbon then combines with it, and the ore becomes converted to magnetic carbide of iron. It is then taken from the muffle and cooled by water, so as to prevent oxidation taking place. This is conveniently done by taking the hot material upon barrows or trucks and tipping it into tanks or vessels containing water. The material is then treated with an acid to remove aforesaid impurities. This is carried out by subjecting the material to, preferably, hydrochloric acid conveyed in water in which the material is placed, (preferably in the cooling tanks or vessels,) and this process is effectually accelerated by causing the liquor to be circulated over and about the material. For this purpose a steam injector or pump may be suitably used. The time taken for the solution of the impurities out of the "carbide" depends upon the strength of the acid liquor and the amount of the impurities in the material. After this treatment the material, (magnetic carbide of iron,) being cleared of impurities, constitutes a material particularly applicable for purifying and filtering "drinking-water;" but it is also applicable for purifying saccharine and alcoholic liquors and gases.

To carry out the said process of the manufacture of the material above described, I employ a muffle. The muffle is preferably of such a size that several tons may be treated in it at one operation, and is in the form of an inclosed long shallow chamber, on one or both sides of which a number of apertures are provided, through which the raking or stirring implements above described may be passed and worked. Upon the roof of the chamber there are provided apertures having hoppers, through which the material is introduced into the muffle, and these are arranged and disposed to effect a distribution of the material over the floor of the chamber. The heating of the walls of the chamber is effected by gas generated in a furnace in connection with the chamber, and the gases and products of combustion are conveyed by suitable flues or ducts surrounding or partly surrounding the chamber.

Having thus specified generally the nature, object, and effects of my invention, its description will now be proceeded with in reference to the drawings by way of explaining more fully the nature, objects, and effects of my invention.

The drawings and the description of them set forth together a special construction of muffle and drying-bed designed on the lines already generally defined for use in carrying out the process of producing the filtering material, the method of which has been above explained.

In the drawings, Figure 1 shows in sectional elevation the muffle. Fig. 2 shows a plan of the muffle, being a section in the horizontal plane at the line marked X X in Fig. 1, and also shows a plan of the drying-bed. Fig. 3 is a cross-section of the muffle and drying-bed, taken in the vertical plane at the line marked Y Y in Fig. 2. Fig. 4 shows a plan of the muffle and the tanks in which the acid purifying process is carried on.

With reference to the drawings, $a$ designates the chamber of the muffle; $b$, the gas-producing furnace, having a secondary air-supply duct, $b'$; $c$, an upper flue; $d$, the lower flues, and $e$ the passage communicating between such flues and the drying-bed $f$.

$g$ are the feed-hoppers, provided with sliding doors $g'$; $h$, the stirring-doors; $i$, drying-plates, and $j$ a barrow-platform.

$k$ represents the floor-plates of the drying-bed $f$.

$m$ are the flues of the drying-bed $f$, and $n$ the chimney-flue for carrying off the waste gases.

$o$ are the cooling and acid tanks.

The chamber $a$ of this example is about thirty feet long and eleven feet wide. It is therefore evident that the quantity of material capable of being treated at one time is considerable. If the material is supplied evenly over the floor of the chamber to a depth of about four to five inches, and this is a convenient depth of material, the weight of the charge would be about five tons.

The mode of operation of performing the portion of the process according to my invention relating to the apparatus illustrated in Figs. 1 to 3 and just described is as follows: The chamber $a$, in which the material is treated, is heated by the gases of combustion from the furnace $b$, which is of the well-known gas-producing type. The gases first pass over and heat the crown of the chamber $a$ through the flue $c$, heating at the same time the drying-plates $i$. At the end of the chamber $a$ the gases descend and pass beneath the floor of the chamber $a$ through the flues $d$ and also heat it. The flues, it will be seen, lie between the division-walls $d'$, employed to support the chamber ($a$) floor. From the opposite end of the flues $d$ the gases pass by the passage $e$ to the drying-bed $f$, which will be hereinafter explained. Thus by the heat above and below the chamber $a$ it is brought up to the required temperature before introducing the material to be treated in it. Then, the ore being broken or ground into small pieces and mixed with about one-quarter of its weight of granulated carbon—such as coke—and about five per cent., by weight, of sawdust or wood, I open the slides $g'$, and then feed the material into the several hoppers $g$, through which it falls onto the floor of the chamber $a$. The object of the sawdust or wood is to either expel the air from the chamber or to neutralize the deterrent action air would have upon the process of converting the ore to the carbide. A similar effect may, however, be produced by introducing steam to the chamber; but for mechanical reasons I prefer to use sawdust.

The temperature at which the union of the carbon and the oxide practically commences and takes place is about that equivalent to or denoted by a clear cherry-red color, and the heat of the material having arrived at this point is maintained there for about two hours. Having been so subjected, the material will have become practically all converted to magnetic carbide, and this stage of the process is then complete. In this treatment of the ore and prior to the union of the carbon with the ore it is partially reduced—namely, from $Fe_2O_3$ to $Fe_3O_4$; but, as previously stated, its reduction to a metallic state must not be allowed.

During the treatment just described the ore, carbon, and sawdust are mechanically mixed by raking and stirring them about with suitable implements. The doors $h$, provided in the side of the chamber $a$, beyond being those through which the material when finished is discharged, also serve as the means by which the implements may be introduced and worked. The effect of the stirring is that the whole mass of material is equally treated, the combining of the carbon and iron oxide is facilitated, and the process is carried out in less time than would be otherwise occupied.

The next chief stage of the process is the purification of the carbide thus made; but this treatment is preferably carried on in further minor or sub processes. The first of these consists in taking the material—now magnetic carbide—from the chamber $a$ and cooling it. This is done preferably and most conveniently by withdrawing it while hot from the chamber $a$ through the apertures of the doors $h$, delivering it into barrows, and then tipping it into cold water held in the tanks $o$. By this procedure—that is, cooling the material while hot—the carbide is best prevented from taking up oxygen from the air and becoming so reoxidized. The water used for the cooling will, of course, be raised considerably in temperature, and in order to use as little acid in the acid purifying sub-process as possible I draw off the water from the tanks $o$ preparatory to such sub-process. The next step or stage of the process consists in subjecting the material to acid for removing its impurities, which, as already stated, consist chiefly of lime, magnesia, phosphorus, and sulphur. This is effected by applying hydrochloric acid or sulphuric acid, but preferably the former, conveyed in water to the material. The mode of applying it consists in delivering the acid over the material in the tanks $o$ by a steam-injector or jet-pump of any known kind, the supply of the liquid being taken from the bottom of the tanks, thereby obtaining a circulation of the liquor, and so accelerating the process. The strength of the acid and the time taken for the solution of the impurities out of the carbide will necessarily depend upon the amount of impurities the carbide contains; but I have found that from one to two Twaddle as the strength of the acid and from two to six hours' subjection of the carbide to it are, respectively, the practical limits of strength and time required to remove the above-named impurities from the carbide produced from the various qualities of ores I have treated.

After the material is treated with acid, as just described, it is preferably washed with water and then dried on the drying-plates $i$ or bed $f$. The washing cleanses the material of acid, and the drying of the material reduces the weight and cost of carriage of it. The material (magnetic carbide of iron) thus deprived of its impurities constitutes a material particularly applicable for purifying and filtering drinking-water; but it is also applicable for purifying water generally, saccharine and alcoholic liquors, and other liquids or gases containing impurities—particularly organic—which may be or are purified more or less by ordinary charcoal, iron, and other kinds of filtering or purifying material.

It is to be understood that where I herein speak of removing impurities from the purifying material I do not mean that I render it absolutely free from the impurities to which I have referred, but merely that I render it practically and reasonably free from such impurities. It is also to be understood that where I speak of purifying water or other fluid I refer to the removal of the impurities to a practical and reasonable degree.

Having now particularly described the nature, object, and purposes of my invention, I would state, in conclusion, that I have described what I consider the best mode of carrying out the manufacture of magnetic carbide of iron for purifying and filtering water and other fluids involving my invention, and the one I prefer to employ. I would have it understood, however, that I do not intend to limit my patent to the precise manner herein specified of effecting the results described or the exact apparatus illustrated, since various mere modifications of these may be made without departing from the spirit or scope of my invention. On the other hand, I wish it to be understood that I make no claim generally to the method of making magnetic carbide of iron by means of combining carbon with iron ores; but What I do claim in respect of the herein-described invention is—

1. In the manufacture of magnetic carbide-of-iron filtering material by reducing iron ore through the medium of heat to a lower oxide and combining carbon therewith, the process herein described of purifying the magnetic carbide of iron, which consists in cooling the same and subjecting it to the action of an acid conveyed by water to remove the lime, magnesia, phosphorus, or other impurities, substantially as described.

2. In the manufacture of magnetic carbide-of-iron filtering material by reducing iron ore through the medium of heat to a lower oxide and combining carbon therewith, the process herein described of purifying the magnetic carbide of iron and removing the lime, magnesia, phosphorus, or other impurities therefrom, which consists in cooling the magnetic carbide of iron in water and then subjecting it to the action of hydrochloric acid conveyed by water, substantially as set forth.

3. The process herein described of manufacturing magnetic carbide-of-iron filtering material, which consists in reducing iron ore by heat in a closed chamber to a lower oxide and combining carbon therewith to convert the ore into magnetic carbide of iron, cooling the latter with water, and while cool purifying the same and removing the lime, magnesia, phosphorus, or other impurity by subjecting the carbide of iron to the action of an acid conveyed by water, substantially as set forth.

4. The process herein described of manufacturing magnetic carbide-of-iron filtering material, which consists in reducing the iron ore by heat to a lower oxide and combining carbon therewith to convert the ore into magnetic carbide of iron, cooling the latter, and then purifying it and removing the lime, magnesia, phosphorus, or sulphur by subjecting the carbide of iron to the action of hydrochloric acid conveyed by water, substantially as set forth.

In testimony whereof I affix my signature in presence of two witnesses.

HAROLD RIMMER.

Witnesses:
STEPHEN HART JACKSON,
*Notary Public, Ulverston.*
WILLIAM S. BURNS,
50 *Soutergate, Ulverston, Solicitor's Clerk.*